United States Patent [19]
Bleske et al.

[11] Patent Number: 5,600,862
[45] Date of Patent: Feb. 11, 1997

[54] PIPE SCRAPER

[75] Inventors: Randy J. Bleske, San Jose; Joel D. Finegan, Fremont, both of Calif.

[73] Assignee: Gas Research Institute, Chicago, Ill.

[21] Appl. No.: 582,698

[22] Filed: Jan. 4, 1996

[51] Int. Cl.$^6$ .............................. F16L 55/18; B08B 9/02
[52] U.S. Cl. ....................... 15/104.04; 15/236.01
[58] Field of Search ................. 15/104.04, 104.03, 15/102, 236.06, 236.01, 236.05, 236.07; 451/381; 408/79, 80, 83, 84; 30/93, 94, 95

[56] References Cited

U.S. PATENT DOCUMENTS

| | | |
|---|---|---|
| 984,577 | 2/1911 | Maglenn .................... 15/236.06 |
| 1,774,567 | 9/1930 | Raphael .................... 15/236.06 |
| 2,204,516 | 6/1940 | Stone ........................ 15/104.04 |
| 2,225,272 | 12/1940 | Home ........................ 15/104.04 |
| 2,473,654 | 6/1949 | Loeser et al. ............... 15/104.04 |
| 3,093,023 | 6/1963 | Vail . | 
| 3,117,375 | 1/1964 | Meese . |
| 3,651,569 | 3/1972 | Arnot . |
| 3,802,793 | 4/1974 | Simon ....................... 15/236.06 |
| 3,924,502 | 12/1975 | Borzym . |
| 4,014,063 | 3/1977 | Bunke ....................... 15/104.04 |
| 4,099,310 | 7/1978 | Mitchell .................... 15/104.04 |
| 4,488,467 | 12/1984 | Hegler et al. . |
| 4,825,543 | 5/1989 | Thalmann et al. . |
| 5,018,275 | 5/1991 | Huang . |
| 5,125,690 | 6/1992 | Taylor et al. . |
| 5,129,158 | 7/1992 | Campagna . |
| 5,203,083 | 4/1993 | Domonoske . |
| 5,285,576 | 2/1994 | Taylor . |

FOREIGN PATENT DOCUMENTS 1498567  8/1989  U.S.S.R. ...................... 15/104.04

OTHER PUBLICATIONS

Fusion Group PLC Pipe Scraper Brochure, Issue Jan. 6, 1994, Smeckley Wood Close, Chesterfield Trading Estate, Chesterfield S41 9PZ.

Primary Examiner—David Scherbel
Assistant Examiner—Tony G. Soohoo
Attorney, Agent, or Firm—Speckman, Pauley & Fejer

[57] ABSTRACT

A pipe scraper for removing a uniform amount of material from the perimeter of a pipe. The pipe scraper has a shoulder and biased members for urging the pipe against an interior surface of the scraper body to achieve a uniform scrape with both round and oval pipes, without a need for blade adjustment. Uneven scraping due to canting of the pipe with respect to the body is also eliminated.

9 Claims, 6 Drawing Sheets

PIPE SCRAPER

BACKGROUND OF THE INVENTION

1. Field of the Invention

This invention relates to a pipe scraper which removes a portion of the exterior surface of a pipe prior to affixing the pipe to a coupling.

2. Description of Prior Art

It is often necessary to remove a portion of the exterior surface of a pipe prior to welding or otherwise affixing the pipe to a coupling. In an electrofusion process for joining plastic pipes, such as those constructed of polyethylene, it is an absolute requirement. Removal of a portion of the exterior surface of the pipe eliminates oxidation of and impurities in the exterior surface of the pipe, and helps ensure a trouble-free joint.

The exterior surface of a pipe should be scraped to a depth of no more than 10 percent of the overall thickness of the pipe wall. Generally, with smaller diameter pipe, such as ½ inch CTS to one inch IPS, removal of about 0.005 inch of the pipe (0.010 on the diameter) will result in good fusion adhesion with a minimum loss of pipe wall thickness. A scrape exceeding 10 percent of wall thickness can compromise the strength of the pipe, while failure to scrape the entire perimeter of the pipe can result in poor fusion adhesion.

A problem often arises when scraping a pipe having an oval cross section. Scraping an oval pipe can result in a scrape exceeding 10 percent of wall thickness on some portions of the pipe, while other portions of the pipe are left entirely unscraped. To scrape such a pipe with a scraper which does not compensate for ovality of a pipe requires complex adjustment of scraper blade depth, which is time consuming, craft sensitive and increases the likelihood of a poorly fused and thus weakened joint.

U.S. Pat. No. 4,825,543 discloses a scraping tool for scraping the exterior surface of polyethylene pipes prior to use in an electrofusion process. The apparatus of the '543 patent includes two curved members which share a common pivot point. The curved members are pivotally opened to accept a pipe, and pivotally closed about the pipe prior to the scraping process. A bell-crank connection positioned at the non-pivot ends of the curved members maintain the apparatus in a closed position. Rollers positioned on the interior of each curved member urge the pipe against a scraping blade mounted on the interior of one of the curved members. The many moving components of the apparatus of the '543 patent increase both the relative cost and likelihood of malfunctioning of such apparatus.

U.S. Pat. No. 5,285,576 discloses a tool for grooving or cutting a pipe. An end of a pipe is inserted in the tool and is supported at two points by rollers. A spring urges a cutting wheel against a surface of the pipe and cuts or grooves the pipe as the tool is rotated with respect to the pipe. The '576 patent provides no teachings regarding how to achieve a uniform scrape of an oval pipe.

U.S. Pat. Nos. 3,117,375 and 3,651,569 disclose tools for cutting pipes or cables. Neither such patent addresses the problems associated with scraping an oval pipe to a uniform depth.

Thus it is apparent that a reliable and relatively economical tool for scraping round and oval pipes to a precise and uniform depth, particularly in the electrofusion industry, is highly desirable.

SUMMARY OF THE INVENTION

It is one object of this invention to provide a relatively economical scraper which achieves a uniform scrape for pipes having either a round or oval cross section.

It is another object of this invention to provide a scraper which can achieve a uniform scrape for an oval pipe without relatively difficult and time-consuming blade adjustments.

It is yet another object of this invention to provide a scraper which eliminates uneven scraping due to canting of the pipe during the scraping process.

It is still another object of this invention to provide a scraper which can be easily adjusted to select a precise axial length of scrape.

These and other objects of this invention are achieved, according to one preferred embodiment, with a scraper having a rigid body which has a circular body bore for receiving an end of a pipe. The body bore has an inner chamber and an outer chamber which are axially aligned. The outer chamber, in which the end of the pipe first enters, has a greater diameter than the inner chamber. A junction of the outer chamber with the inner chamber forms an annular shoulder or step.

As the pipe enters the outer chamber, a surface of the pipe contacts a bias member which recesses into the scraper body. As a user axially urges the exterior surface of the pipe past the bias member, the bias member biases the pipe against the inner surface of the outer chamber. Such biasing against the inner surface helps assure that the axial center of the pipe is parallel to the axial center of the body bore. In the absence of such biasing, a user of the scraper must be extremely careful to avoid canting of the pipe with respect to the body bore. Canting of the pipe with respect to the body bore will result in an uneven scrape which can adversely affect the strength of a weld.

A scraping blade is mounted at least partially in the scraper body such that a blade scraping edge is exposed to the body bore. Preferably the majority of the blade scraping edge extends into the inner chamber, and is flush with the interior surface of the inner chamber. A small portion of the blade scraping edge projects into the outer chamber.

The pipe end is scraped by axially urging the scraper against the pipe end while rotating either the scraper or the pipe. Alternately, the pipe can be axially urged against the scraper while either the scraper or the pipe is rotated. The pipe scraper can have handles to ease grasping and rotating of the scraper. As the outer surface of the pipe contacts the blade scraping edge, a uniform thickness of pipe is removed. Preferably the scraper body has an opening adjacent the blade through which pipe scrapings can exit the body.

As the scraped end of the pipe is urged into the inner chamber, an exterior surface of the pipe contacts an additional biased member which continually urges the pipe against the interior surface of the inner chamber. The biased member, in combination with the biased member of the outer chamber, serves to prevent the pipe from canting with respect to the body bore, and thus ensures a uniform scrape.

The scraper according to one preferred embodiment of this invention achieves a uniform scrape of an oval pipe. Each biased member provides continuous biasing force radially against the pipe to ensure contact of the exterior surface of the pipe with the blade scraping edge. The biased member recesses as it contacts the larger diameter portion of an oval pipe, yet projects farther into the body bore as it contacts the smaller diameter portion of an oval pipe.

According to one preferred embodiment of this invention the biased member includes a spring bore which is in communication with the body bore. A spring is positioned in the spring bore, and a ball bearing or roller is positioned on the spring. The diameter of the opening between the spring bore and the body bore is less than the diameter of the ball bearing, and thus a portion of the ball bearing projects into the body bore while the majority of the ball bearing is retained in the spring bore.

According to another preferred embodiment of this invention, two biased members are positioned in the outer chamber. The biased members are positioned about 90 degrees apart from each other in a plane perpendicular to a center axis of the body bore. Two biased members in a similar configuration can be positioned in the inner chamber in a plane perpendicular to the center axis of the body bore which includes the scraping edge of the blade.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Uniform removal of a portion of the perimeter of a pipe is important to achieve good fusion adhesion with a minimum loss of wall thickness. If too little or none of the exterior surface is removed, adhesion may not occur, and if too great a depth of surface is removed, the strength of the pipe may be compromised. Uniform removal about the perimeter of a pipe becomes a problem in the case of a pipe with an oval cross section. Because the diameter of the scraper bore in which the pipe is inserted must be slightly larger than the diameter of the pipe, when an oval pipe is rotated within the scraper bore, the shorter diameter portion of an oval pipe often loses contact with the blade scraping edge, and thus is left unscraped after the scraping process. Often the blade is adjusted to compensate for the varying diameter of the oval pipe. Such blade adjustment is complex, and thus generally requires specially trained personnel, and is also time-consuming, and thus increases labor costs associated with pipe welding. Further, such blade adjustment increases the danger of accidentally removing too much of the exterior pipe surface and compromising the pipe wall strength.

Another problem associated with a conventional pipe scraper is the free play between the exterior surface of the pipe and the interior surface of the scraper. Such free play can cause canting of the pipe with respect to the scraper and lead to uneven scraping, or to an improper depth of scrape.

Figure 1:
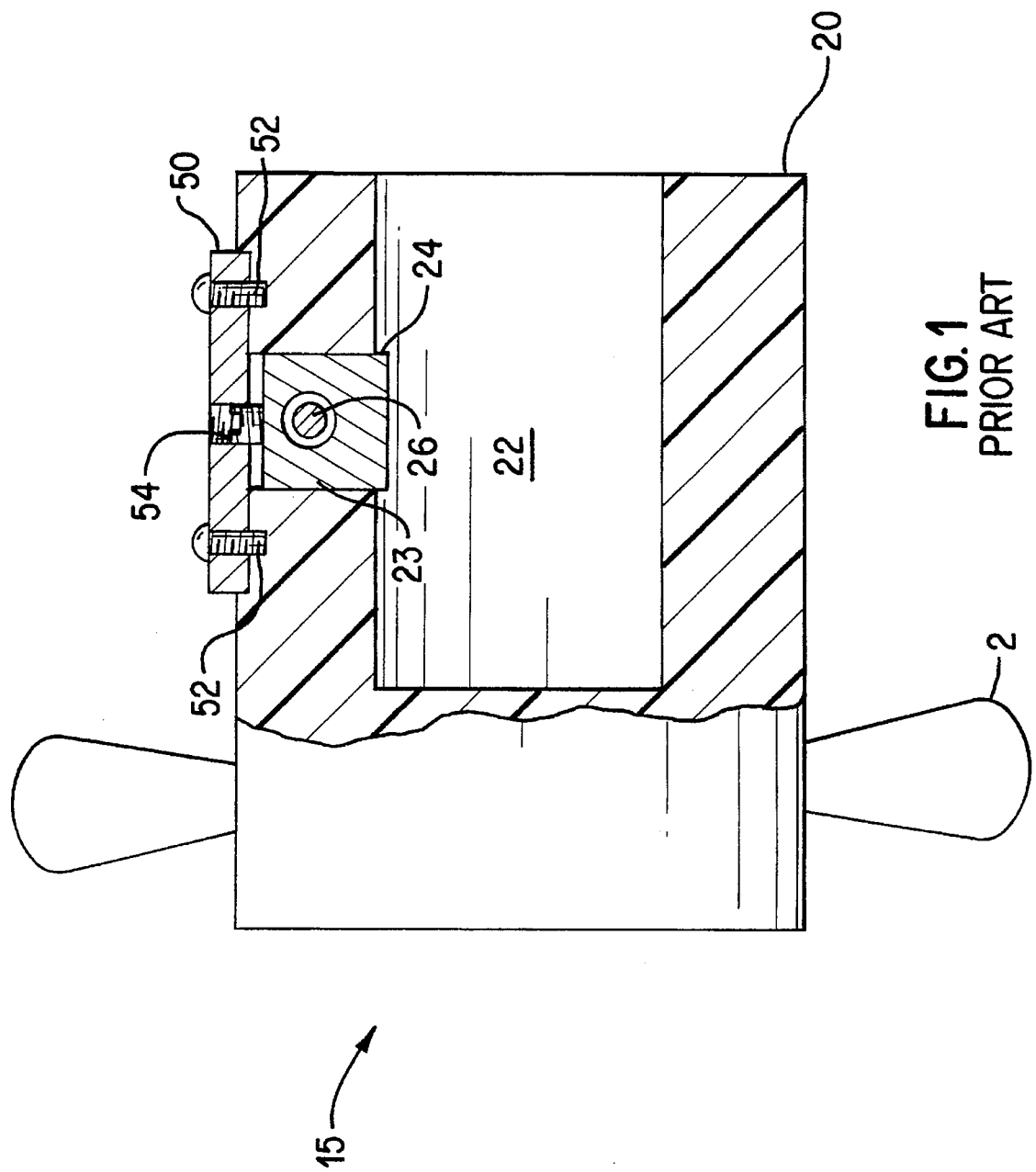
FIG. 1 shows a partial cross-sectional view of a conventional scraper.

A cross-sectional view of a conventional scraper 15 is shown in FIG. 1. Such conventional scraper 15 includes a body 20 having a body bore 22 of uniform diameter. A blade 23 partially extends into body bore 22 so that a blade scraping edge 24 can contact the exterior surface of an inserted pipe. A plate 50, plate screws 52 and a set screw 54 in combination with a blade screw 26 prevent blade 23 from moving during the scraping process. As shown in FIG. 1, blade 23 can be adjusted with respect to body 20 by loosening blade screw 26, adjusting set screw 54 and tightening blade screw 26. Handles 2 allow a user of scraper 15 to firmly grasp and rotate scraper 15 with respect to a pipe.

Figure 2:
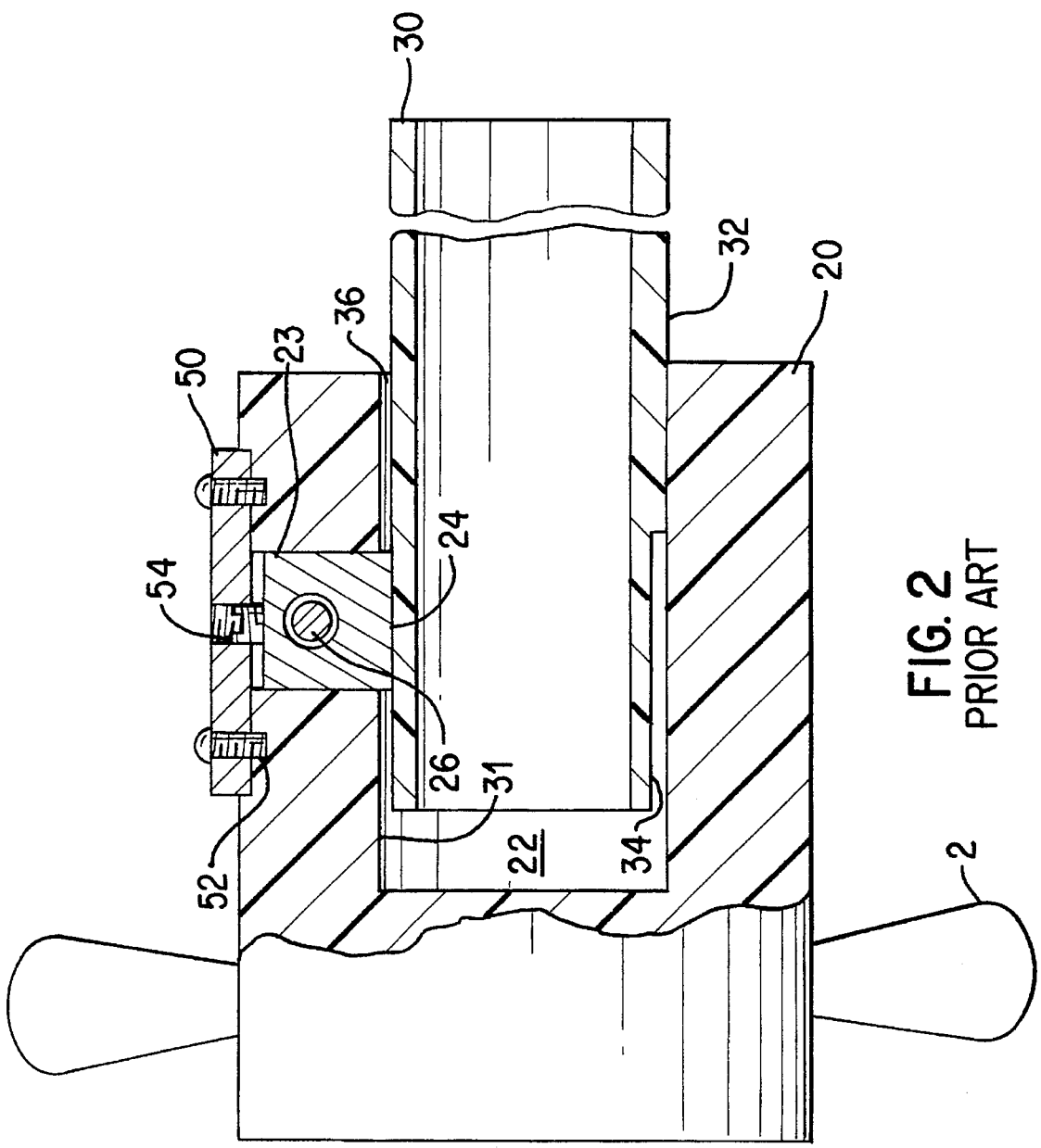
FIG. 2 shows a partial cross-sectional view of a conventional scraper and a partially scraped pipe.

FIG. 2 shows a conventional scraper 15 and a partially scraped pipe 30. Because body bore 22 must be at least slightly larger than the diameter of pipe 30 in order to accept pipe 30, there exists a gap 36 between an interior surface 31 of body 20 and an unscraped exterior pipe surface 32. Gap 36 allows pipe 30 to cant with respect to body 20, and thus can result in an uneven scrape of pipe 30, which can result in a weak weld.

Figure 3:
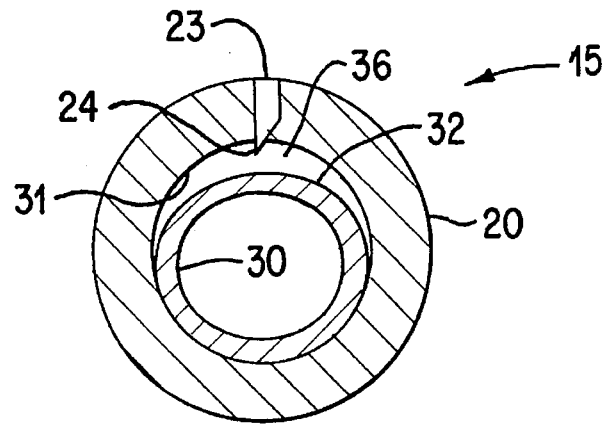
FIG. 3 shows a schematic view of the interior of a conventional scraper and an oval pipe.

FIG. 3 shows a schematic view of conventional scraper 15 and an oval pipe 30. The diameter of oval pipe 30 varies in a radial direction. As pipe 30 is rotated with respect to body 20, gap 36 increases and decreases because of such varying diameter. FIG. 3 shows oval pipe 30 with a major diameter being horizontal, and a minor diameter being vertical. As clearly seen, when the minor diameter portion of pipe 30 is nearest blade scraping edge 24, gap 36 is so large that no scraping of pipe 30 occurs.

Figure 4:
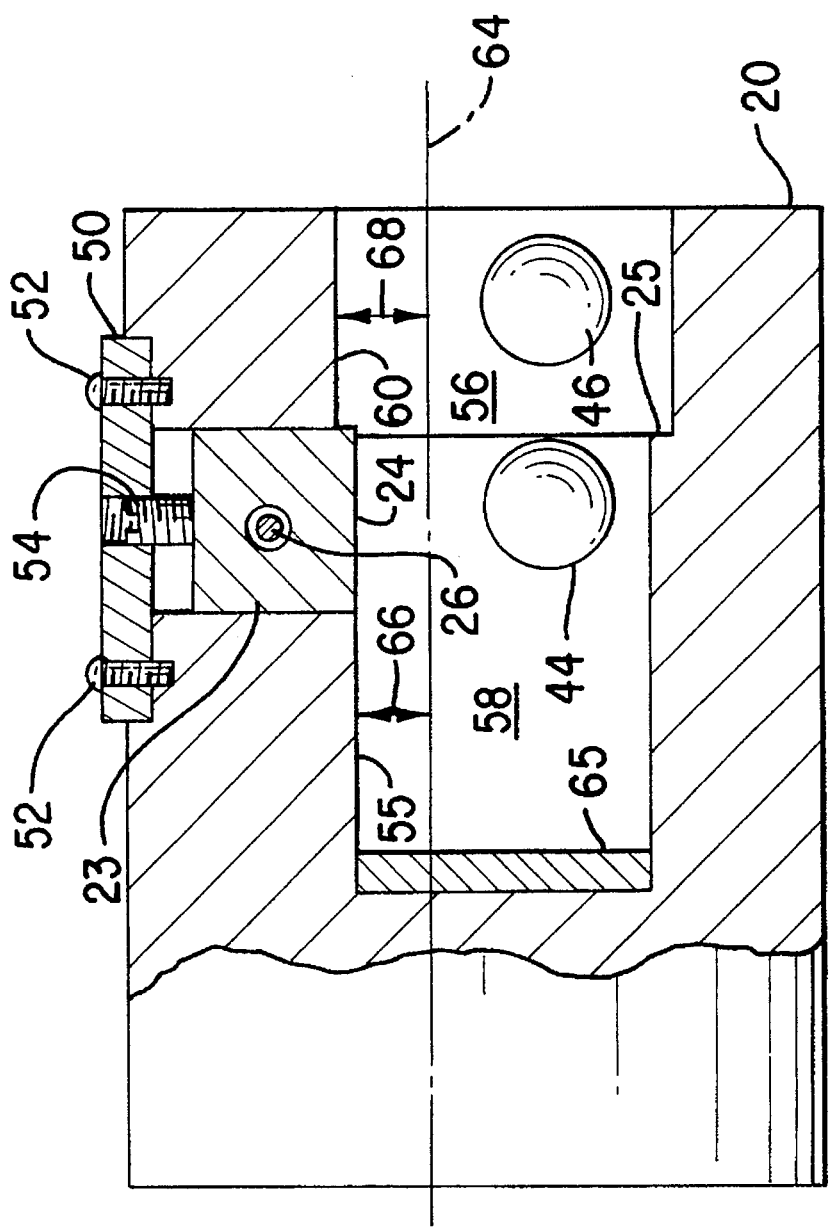
FIG. 4 shows a partial cross-sectional view of a scraper according to one preferred embodiment of this invention.

FIG. 4 shows a partial cross-sectional view of a scraper 15 according to one preferred embodiment of this invention. Body 20 has a first bore 58 and a second bore 56 which are axially aligned. A shoulder or step 25 is preferably formed where first bore 58 and second bore 56 join. A major portion of blade scraping edge 24 is preferably flush with a first interior surface 55. According to another preferred embodiment of this invention, a plug 65 of desired thickness can be fixedly or removably positioned in first bore 58 to adjust an axial length of scrape. Biased members such as ball bearings 44, 46, described in more detail below are positioned in body 20 and project into first bore 58 and second bore 56, respectively. An additional ball bearing 46 is preferably positioned in the same radial plane as the first ball bearing 46. Ball Bearings 46 are preferably positioned to equally urge the exterior of pipe 30 against second interior surface 60. For example, a first ball bearing 46 can be positioned 135°, in a clockwise direction when looking into first bore 58, from blade scraping edge 24. The second ball bearing 46 can be positioned 135° in a counterclockwise direction from blade scraping edge 24 so ball bearings 46 equally urge the exterior surface of pipe 30 against second interior surface 60 from which blade scraping edge 24 extends. Similarly, ball bearings 44 can be positioned in a radial plane and about 135° degrees, in such clockwise and counterclockwise directions, from the blade scraping edge 24, as shown in FIG. 4. Thus, in both first bore 58 and second bore 56 biased members such as ball bearings 44, 46 are positioned to urge an entering pipe 30 against interior surfaces 55, 60 of scraper 15. It is apparent that such biased members can be placed closer or farther apart than 90° from each other to achieve similar bias forces acting upon pipe 30.

Although first bore 58 and second bore 56 as shown in FIG. 4 each have a generally circular cross section, such a circular or overall round cross section is not required for scraper 15 according to this invention. Because scraping edge 24 and ball bearings 44, 46 preferably form a three-point contact with pipe 30, the geometry of the interior of first bore 58 and second bore 56, especially with respect to that portion of first bore 58 and second bore 56 in the area of ball bearings 44, 46 is relatively unimportant.

A portion of blade scraping edge 29 preferably projects into second bore 56. The depth of step 25 is preferably about one-half the difference in diameter between first bore 58 and second bore 56. An alternative way to describe the relationship between first bore 58 and second bore 56, according to one preferred embodiment of this invention, is with reference to longitudinal axis 64. Longitudinal axis 64 is in a plane which includes a surface of blade 23 and generally divides first bore 58 and second bore 56. Distance 66 measured between first interior surface 55 and longitudinal axis 64 is less than distance 68 measured between second interior surface 60 and longitudinal axis 64. Thus, a scraped surface of pipe 30 is contacted by first interior surface 55 while an unscraped surface of pipe 30 is contacted by second interior surface 60. As shown in FIG. 4, scraping blade edge 24 is preferably, but not necessarily, flush with first interior surface 55 and extends radially into second bore 56 a distance equivalent to the depth of step 25. Thus, the depth of step 25 is preferably designed to be about equal to the desired depth of scrape.

Figure 5:
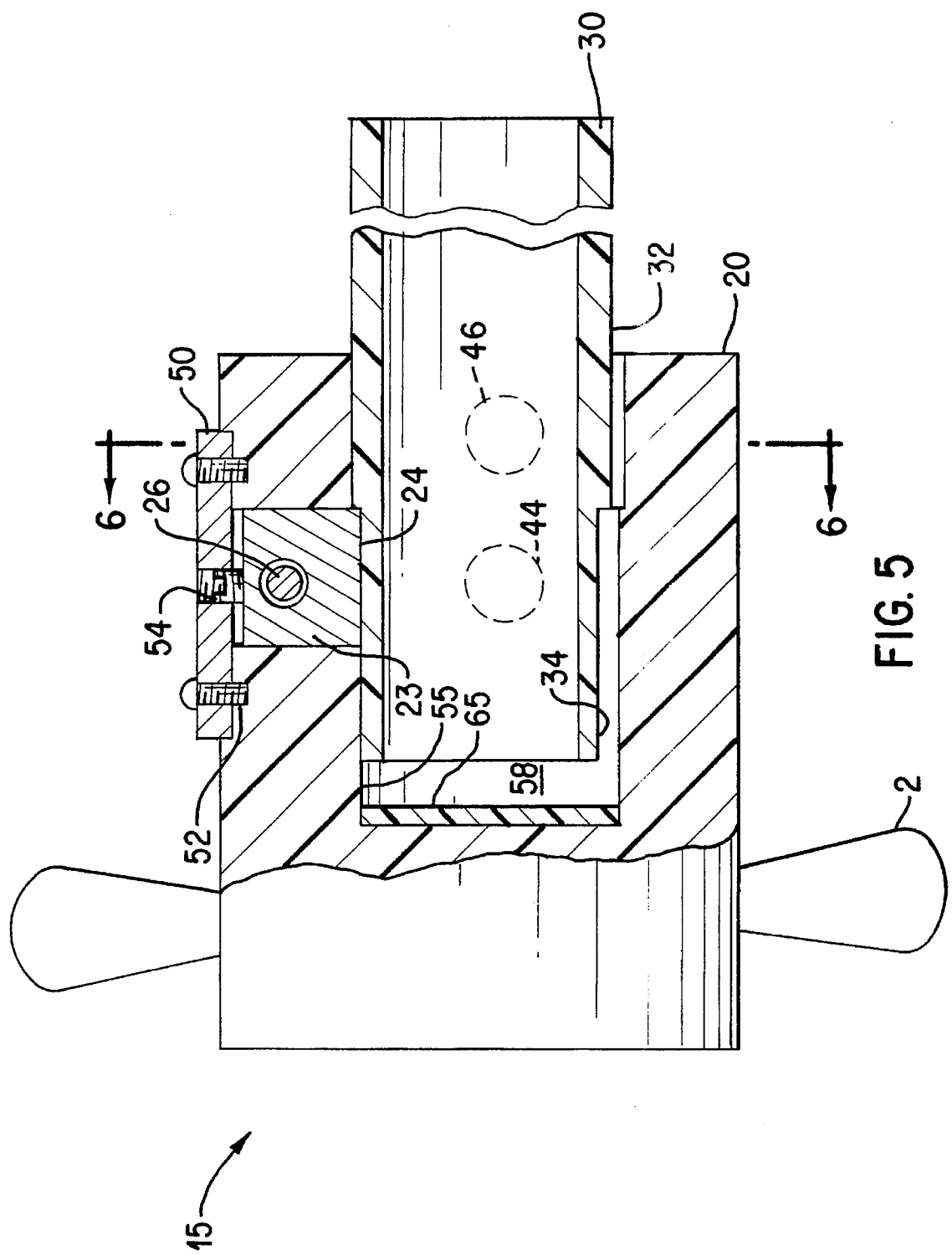
FIG. 5 shows a partial cross-sectional view of a scraper according to one preferred embodiment of this invention and a partially scraped pipe.

As shown in more detail in FIG. 5, according to one preferred embodiment of this invention, biasing members can comprise a spring 40 positioned in a spring bore 48 of body 20, and ball bearing 44 positioned such that ball bearing 44 is either directly or indirectly urged by spring 40. Ball bearing 44 has a greater diameter than a diameter of the opening between spring bore 48 and body bore 22. Thus, spring 40 urges ball bearing 44 at least partially into body bore 22, yet the smaller diameter of the opening prevents ball bearing 44 from completely entering body bore 22. It is apparent that any suitable biasing member capable of exerting sufficient force upon ball bearing 44, such as a leaf spring properly mounted within a suitable groove of body 20 or any other suitable apparatus that delivers a biasing force, can be used in place of spring 40. It is also apparent that other contact members that can simultaneously urge pipe 30 against an interior surface of body 20, while allowing pipe 30 to rotate with respect to body 20, can be used in place of ball bearing 44. For example, a suitable roller device could be used in place of ball bearing 44. It is also apparent that body bore 22 can be sufficiently large with respect to a diameter of pipe 30 that spring 40 and ball bearing 44 can be positioned in a suitable housing which itself is positioned in the interior of body bore 22. Such a housing can eliminate the need for spring bore 48.

FIG. 5 shows scraper 15, according to one preferred embodiment of this invention, with a pipe 30 mounted within bores 56, 58. Biased members such as ball bearings 44, 46 urge pipe 30 against the interior surfaces 55, 60 of body 20 from which blade scraping edge 24 extends. Because of the constant force exerted by springs 40 through ball bearings 44, 46, the bias force must be overcome in order to cant pipe 30 with respect to body 20. Such bias force can be adjusted to a desired magnitude. Even after scraped pipe portion 34 extends beyond blade scraping edge 24, and into first bore 58, scraped pipe portion 34 is firmly supported against first interior surface 55 since first interior surface 55 is preferably flush with blade scraping edge 24. Thus, during the scraping process a longitudinal axis of pipe 30 remains parallel to a longitudinal axis of body bore 22 to eliminate canting and thus uneven scraping. The force exerted through biased members such as ball bearings 44, 46 against pipe 30 ensure that pipe 30 is continually urged against blade scraping edge 24 regardless of any deviations in the diameter of pipe 30 within a radial plane.

Figure 6:
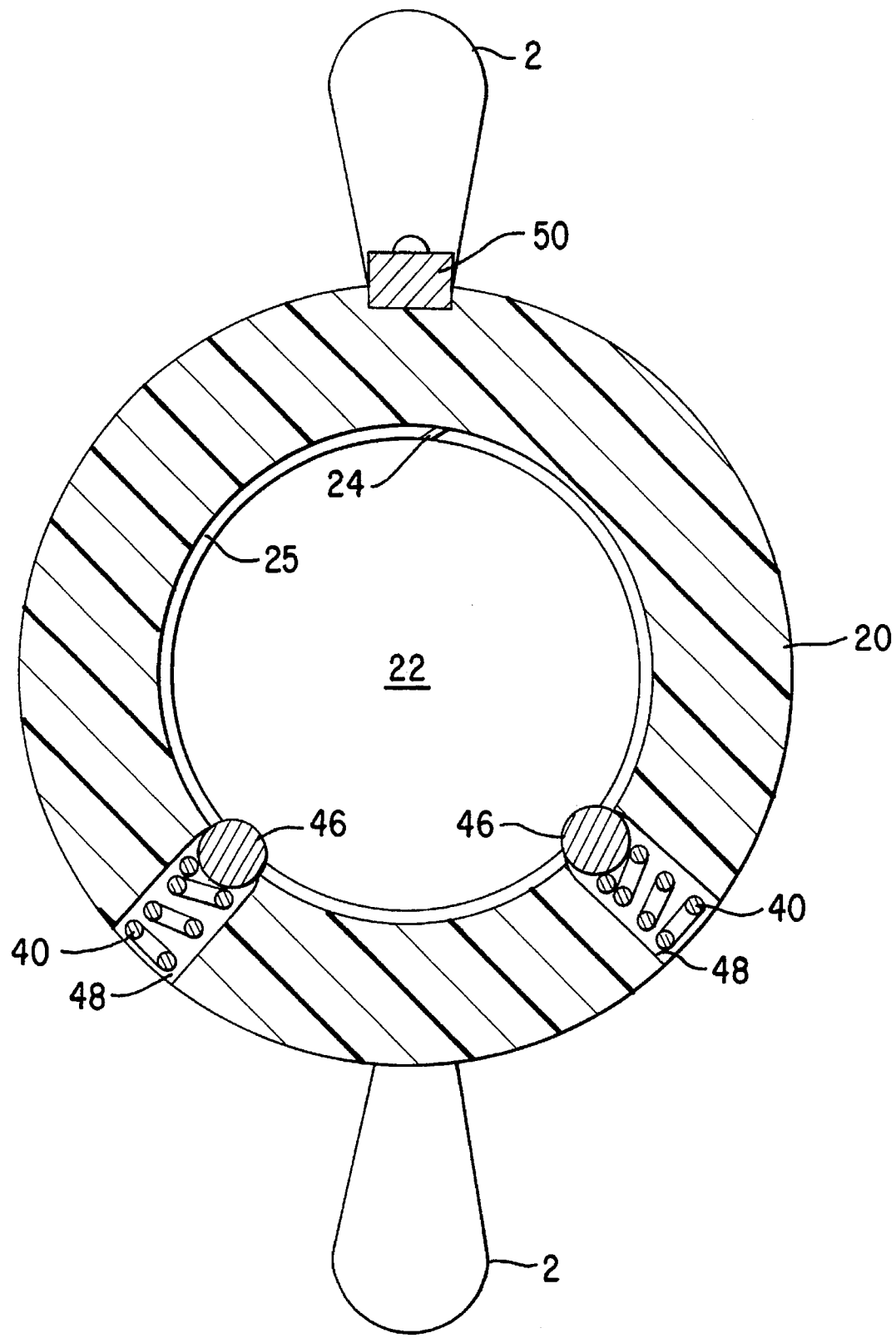
FIG. 6 shows a cross-sectional view of the scraper shown in FIG. 5 taken along line 6—6 of FIG. 5.

As shown in FIG. 6, a center axis of spring bore 48 is preferably, but not necessarily, perpendicular to a longitudinal center axis of body bore 22. Ball bearings 44 are preferably positioned to urge pipe 30 against surface 55 of the interior of body 22 from which blade scraping edge 24 extends.

Figure 7:
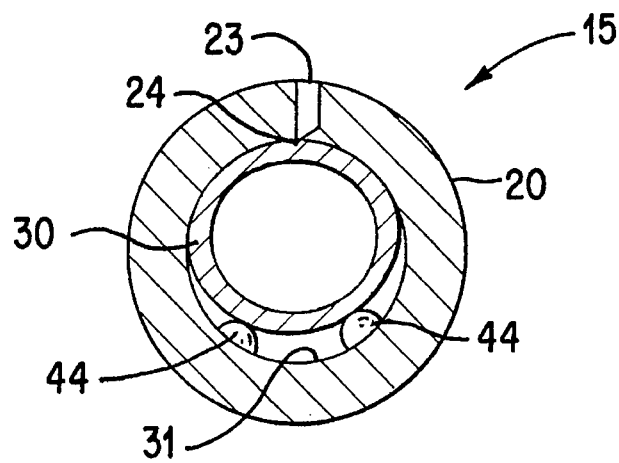
FIG. 7 shows a schematic view of the interior of a scraper according to this invention and an oval pipe.

The continued force exerted through ball bearings 44, 46 eliminates uneven scraping due to ovality of a pipe. FIG. 7 shows a schematic view of scraper 15, according to one preferred embodiment of this invention, with oval pipe 30 mounted within bores 56 and 58. Biased ball bearings 44, 46 continually urge pipe 30 against the portion of interior surfaces 55, 60 from which blade scraping edge 24 extends. As clearly shown in FIG. 7, even when the minor diameter portion of oval pipe 30 is nearest blade scraping edge 24, such minor diameter portion is evenly scraped. Thus, scraper 15 according to this invention achieves a uniform scrape of both round and oval pipes.

Figure 8:
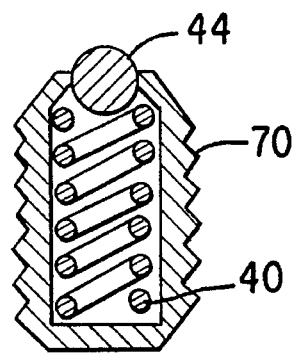
FIG. 8 shows an integral member including a spring and ball bearing according to another preferred embodiment of this invention.

FIG. 8 shows an externally threaded integral housing 70 containing spring 40 and ball bearing 44, 46. Spring bore 48 can be internally threaded to threadedly receive integral housing 70. An end of integral housing 70 opposite the end of integral housing 70 containing ball bearing 44, 46 can have an external surface configured to mate with a screwdriver or an allen wrench, for example. The extent to which ball bearing 44, 46 extends into first bore 58 or second bore 56 can be easily and quickly adjusted by engaging and rotating integral housing 70 with such a tool.

EXAMPLE

A scraper 15 according to one preferred embodiment of this invention was designed and tested with extremely favorable results. First bore 58 had a diameter of 0.636 inches and an axial length of 0.775 inches. Second bore 56 had an overall diameter of 0.646 inches and an axial length of 0.925 inches. Blade scraping edge 24 was substantially flush with interior surface 55 and projected axially into second bore 56 a distance of 0.005 inches. Two spring plunger bores were formed in body 20 at right angles to one another and each having a longitudinal axis perpendicular to a longitudinal axis of body bore 22. A center of each spring plunger bore was 0.425 inches axially inward from the exterior face of scraper 15. Two additional spring plunger bores were positioned in similar fashion in first chamber 58. A center axis of each such spring plunger bore was 1.165 inches axially inward from the face of scraper 15. The scraper performed well and scraped to a uniform depth of 0.010 (on the diameter) for both round and oval pipes.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an apparatus for scraping an external surface of a pipe, the apparatus having a rigid body, the body having an interior surface defining a longitudinal body bore about a longitudinal axis, the body having an open end for receiving the pipe within the body bore and an opposite closed end, a blade disposed in said body bore and extending along said longitudinal axis, said blade being positioned longitudinally away from the open end and having a scraping edge, the improvement comprising:

said scraping edge of the blade projecting into the body bore, the scraping edge having a leading end and a trailing end and being positioned such that the distance of the leading end is at a longitudinal distance closer to the open end than the distance of the trailing end to said open end;

said interior surface having a first interior surface between said open end and said leading end, and a second interior surface between said trailing end and said closed end, and whereby a first distance measured between said longitudinal axis and said first interior surface is greater than a second distance measured between said longitudinal axis and said second interior surface; and a bias member mounted within said body for urging the pipe against said interior surface when said pipe is at least partially mounted within the body bore, said bias member further comprising a contact member for contacting and abutting the pipe.

2. In an apparatus according to claim 1 further comprising adjustment means for adjusting a position of the blade with respect to the body.

3. In an apparatus according to claim 2, wherein a plug is positioned within the body bore and the plug limits longitudinal insertion of the pipe within the body bore.

4. In an apparatus for scraping an external surface of a pipe, the apparatus having a rigid body, the body having an interior surface defining a longitudinal body bore about a longitudinal axis, the body having an open end for receiving the pipe within the body bore and an opposite closed end, a blade disposed in said body bore and extending along said longitudinal axis, said blade being positioned longitudinally away from the open end and having a scraping edge, the improvement comprising:

said scraping edge of the blade projecting into the body bore, the scraping edge having a leading end and a trailing end and being positioned such that the distance of the leading end is at a longitudinal distance closer to the open end than the distance of the trailing end to said open end;

said interior surface having a first interior surface between said open end and said leading end, and a second interior surface between said trailing end and said closed end, and whereby a first distance measured between said longitudinal axis and said first interior surface is greater than a second distance measured between said longitudinal axis and said second interior surface;

at least two outer bias members mounted to the interior surface of the body and circumferentially spaced on said first interior surface;

at least two outer contact members each being urged by a corresponding outer bias member for abutting the pipe when said pipe is at least partially mounted in the body bore;

at least two inner bias members mounted to the interior surface of the body and circumferentially spaced and longitudinally positioned along said body bore from the leading end to said closed end;

and at least two inner contact members each being urged by a corresponding inner bias member for abutting the pipe when said pipe is at least partially mounted in the body bore.

5. In an apparatus according to claim 4, wherein one of the inner bias members is circumferentially positioned about 135° in a clockwise direction from the scraping edge, and another of the inner bias members is positioned about 135° in a counterclockwise direction from the scraping edge.

6. In an apparatus according to claim 4, wherein one of the outer bias members is circumferentially positioned about 135° in a clockwise direction from the scraping edge, and another of the outer bias members is positioned about 135° in a counterclockwise direction from the scraping edge.

7. In an apparatus according to claim 6, wherein the bias member comprises a spring, the contact member comprises a ball bearing, the spring urges the ball bearing toward the body bore, and at least a portion of the ball bearing projects into the body bore.

8. In an apparatus for scraping an external surface of a pipe, the apparatus having a rigid body, the body having an interior surface defining a longitudinal body bore about a longitudinal axis, the body having an open end for receiving the pipe within the body bore and an opposite closed end, a blade disposed in said body bore and extending along said longitudinal axis, said blade being positioned longitudinally away from the open end and having a scraping edge, the improvement comprising:

said scraping edge of the blade projecting into the body bore, the scraping edge having a leading end and a trailing end and being positioned such that the distance of the leading end is at a longitudinal distance closer to the open end than the distance of the trailing end to said open end;

said interior surface having a first interior surface between said open end and said leading end, and a second interior surface between said trailing end and said closed end, and whereby a first distance measured between said longitudinal axis and said first interior surface is greater than a second distance measured between said longitudinal axis and said second interior surface;

the body having a plunger bore, a center longitudinal axis of the plunger bore being generally transverse to said longitudinal axis; and a bias member positioned in the plunger bore, and a contact member mounted to said bias member for urging the pipe against the interior surface when said pipe is at least partially mounted within the body bore.

9. In an apparatus according to claim 8, wherein the contact member is at least partially recessed within the plunger bore.

* * * * *